Sept. 29, 1964  W. J. OPOCENSKY  3,150,528
INTEGRATOR CONTROL
Filed Nov. 15, 1962  3 Sheets-Sheet 1
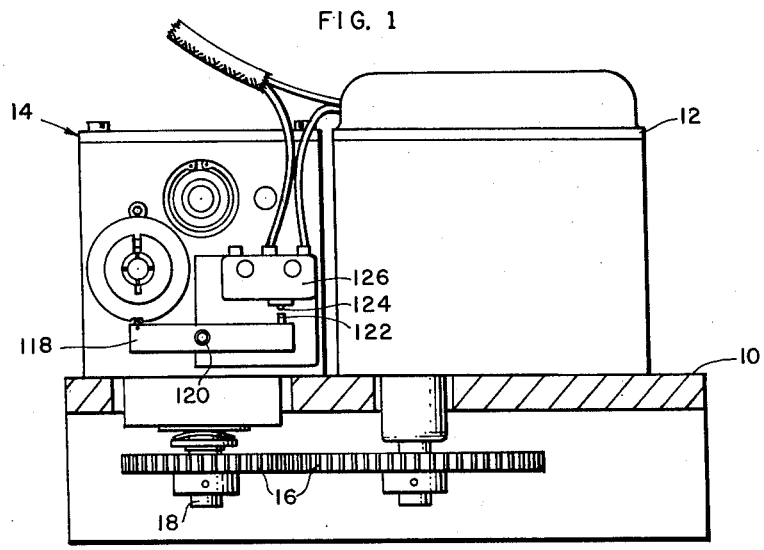
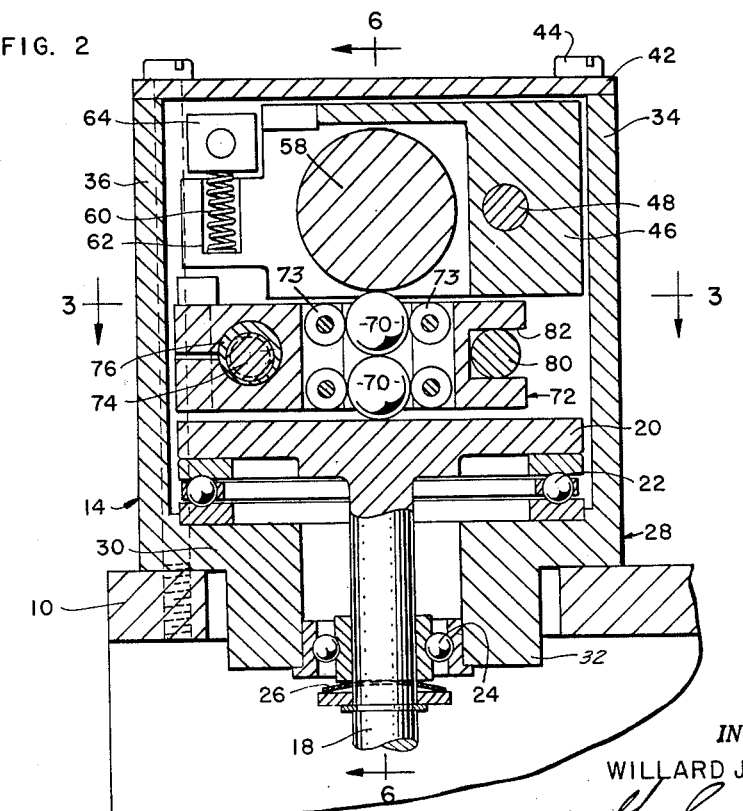
INVENTOR.
WILLARD J. OPOCENSKY
ATTORNEY Sept. 29, 1964  W. J. OPOCENSKY  3,150,528
INTEGRATOR CONTROL Filed Nov. 15, 1962  3 Sheets-Sheet 2

Sept. 29, 1964　　　W. J. OPOCENSKY　　　3,150,528
INTEGRATOR CONTROL

Filed Nov. 15, 1962　　　　　　　　　3 Sheets-Sheet 3

United States Patent Office 3,150,528
Patented Sept. 29, 1964

1

3,150,528
INTEGRATOR CONTROL
Willard J. Opocensky, Glendale, Calif., assignor to
General Precision, Inc., a corporation of Delaware
Filed Nov. 15, 1962, Ser. No. 237,904
6 Claims. (Cl. 74—198)

This invention relates to mechanical integrators, and more particularly to a new and improved precision mechanical integrator of the ball and disk type.

In an integrator of the type used in computing mechanisms, extreme accuracy in manufacture and maintenance is mandatory. While extreme accuracy may be accomplished in manufacturing, maintaining this accuracy in operation under certain circumstances is particularly difficult. One of such circumstances is wherein the torque transmission balls are in the "zero" position, i.e., when the transmission balls are in the exact center of the input disk. In such zero position the torque transmission balls are stationary while the input disk is rotating at a constant speed resulting in a relative movement between this input disk and the transmission ball in contact with such a disk. While a short duration of such a condition may be tolerated, a long period of relative movement between these members in a zero position will produce an abrasion action between the disk and balls, resulting in a flat or irregular surface on the transmission balls and/or a spot worn on the input disk.

It is the purpose of this invention to eliminate the abrasion action between the input disk and torque transmission balls by stopping the rotation of the input disk when the torque transmission balls reach the zero position, and then restoring the rotation when the transmission balls are indexed to either side of the zero position.

Another problem in integrators is their use in vehicles subject to extreme shocks and vibrations. In such type of use, particularly in integrators having a yieldably mounted, spring tensioned input disk or output cylinders, shock forces are imparted into these yieldable members causing a "hammer-like" blow against the transmission balls driving them into the surface of the input disk and/or transmission balls.

One solution of this problem will be disclosed in this application wherein the travel of a spring tensioned output cylinder will be limited to the extent that it will be unable to deliver a "hammer-like" blow against the transmission balls and into the input disk.

One object of this invention is to provide an integrator with a means to interrupt the rotation of the input disk at the "zero" position of the ball carriage.

Another object of this invention is to provide an integrator with a spring tensioned yieldably mounted output cylinder wherein the movement of the output cylinder is limited.

These objects, and such other objects that may hereinafter appear, will become apparent from the following description of preferred embodiments of the present invention as shown in the accompanying drawings, in which:

FIGURE 1 is a side view of an integrator together with a drive and electrical switching mechanism, embodying the present invention;

FIGURE 2 is a vertical section taken through the integrator looking in the same direction as FIGURE 1;

2

Figure 3:
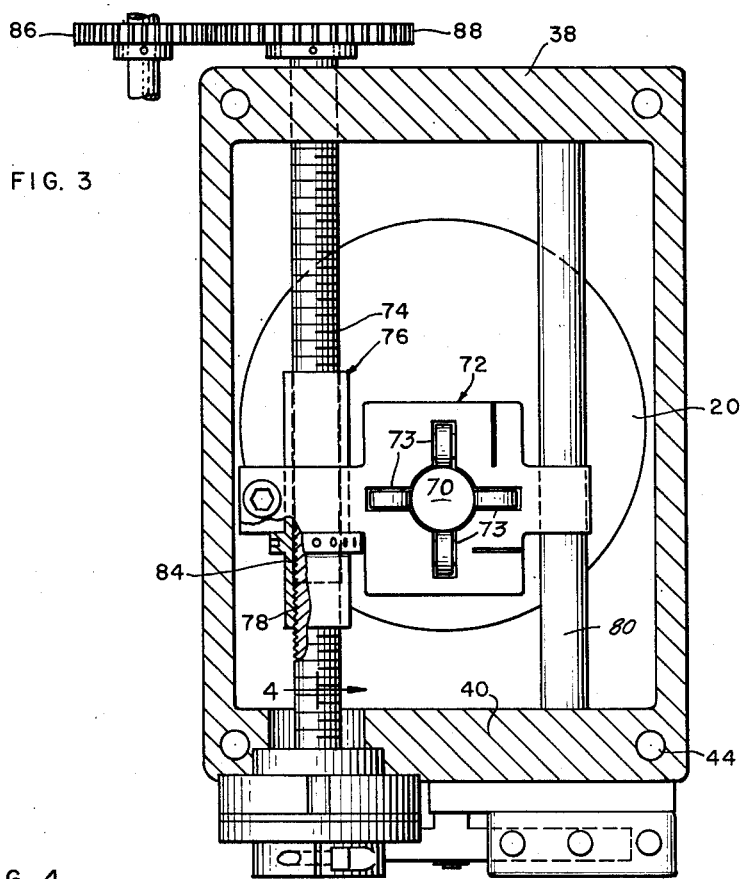
FIGURE 3 is a horizontal section taken through the integrator taken on the line 3—3 of FIGURE 2.
Figure 4:
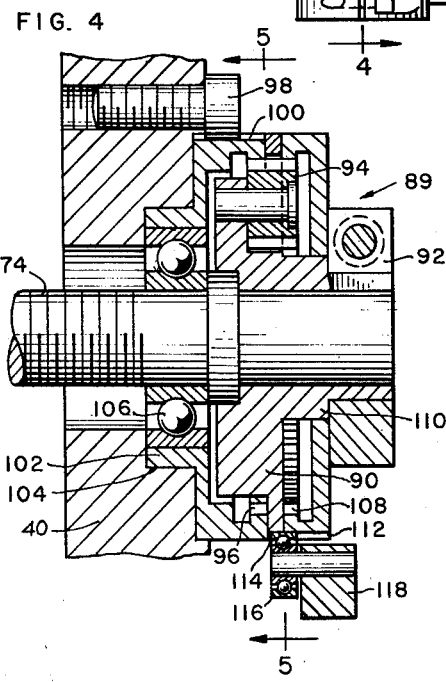
Figure 5:
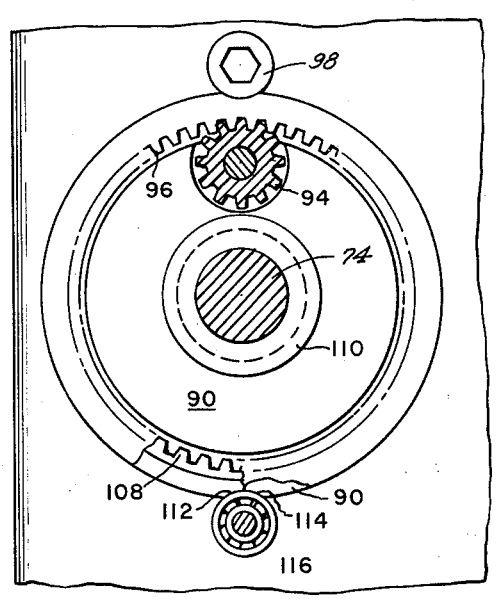
Figure 6:
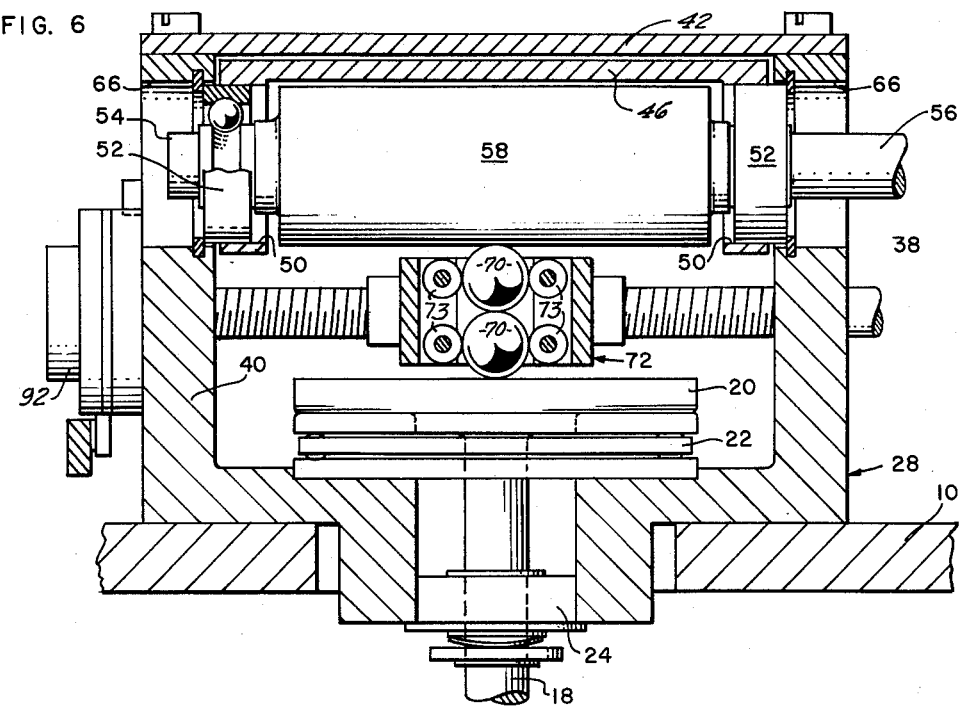

FIGURE 4 is an enlarged detail section of a planetary gear mechanism taken on the line 4—4 of FIGURE 3;

FIGURE 5 is a section taken on the line 5—5 of FIGURE 4;

FIGURE 6 is a section taken on the line 6—6 of FIGURE 2; and

Figure 7:
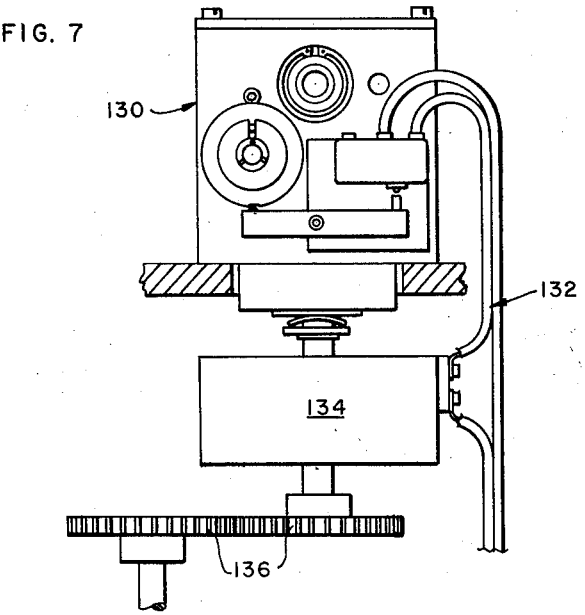

FIGURE 7 is a view of an integrator coupled to the drive mechanism through an electrically operated clutch.

FIGURE 1 illustrates one embodiment of this invention wherein the integrator, drive mechanism, and electrical switching means are packaged in one unit. It will be obvious to those skilled in the art that many variations of arrangement of these elements would be possible without departing from the spirit of the invention.

As illustrated in FIGURE 1, a base 10 supports a motor 12 and an integrator generally indicated as 14. A train of gears 16 may connect the drive shaft of motor 12 to disk input shaft 18 of integrator 14. The integrator 14 is comprised generally of the conventional arrangement of an input disk, torque transmission balls confined in a reciprocally mounted carriage, and an output cylinder.

As most clearly illustrated in FIGURES 2 through 6, the input shaft 18 may be an integral part of input disk 20. The periphery of disk 20 is supported by a thrust bearing 22 and input shaft 18 is supported by a radial bearing 24. A spring washer 26 maintains a tension contact of input disk 20 against thrust bearing 22. Spring washer 26 also preloads radial bearing 24 and thrust bearing 22 to remove any "play" that may exist.

Thrust bearing 22 and radial bearing 24 are suitably supported in a housing 28 which comprises a base 30 having an extending hub 32, front and back walls 34 and 36, and end walls 38 and 40. A cover 42 completes the enclosure and is held in place by screws 44 which also serve to secure the entire integrator to base 10. As will be most clearly seen in FIGURE 2, thrust bearing 22 is positioned in the integrator base 30 and radial bearing 24 is positioned in the integrator housing extending hub 32.

The output cylinder 58 of integrator 14 is supported by a frame member 46 pivotally mounted on a pin 48, which in turn is secured in the end walls of housing 28. As more clearly illustrated in FIGURE 6, frame member 46 is provided with a pair of bores 50 adapted to receive a pair of radial bearings 52 which protrude from the sides of frame member 46. Radial bearings 52 support a stub shaft 54 and an output shaft 56 which in turn are integral with and axially aligned with output cylinder 58.

The radial bearings 52 which protrude from the frame member 46 extend into a pair of bored holes 66 in the end walls 38 and 40 of housing 28. The diameter of the bored holes 66 exceed the outside diameter of radial bearings 52 by a small amount to provide an effective clearance around the bearings. This clearance may be in the range of approximately two thousandths of an inch. The purpose of such clearance will be hereinafter clearly explained.

A pair of compression springs 60, only one of which is shown in FIGURE 2, are located adjacent the two free corners of the pivotally mounted frame member 46. One end of the springs 60 engages pockets 62 in the frame 46; the other ends of springs 60 are retained by blocks 64, which are pivotally secured to the end walls 38 and 40.

A pair of contacting torque transmission balls 70 are disposed between, and in frictional engagement with, output cylinder 58 and input disk 20 for providing a drive between the input disk and output cylinder. The axis of balls 70 is normal to the face of disk 20.

The balls 70 are retained in a ball carriage 72 by roller bearings 73 which are mounted in ball carriage 72 upon axes parallel to the face of disk 20. The structure of ball carriage 72 and the mounting of balls 70 in rollers 73 are similar in construction and function to that illustrated and described in U.S. Patent Number, 3,004,441, issued to Willard J. Opocensky on October 17, 1961.

Transverse movement of the ball carriage 72, parallel to the axis of output cylinder 58, is accomplished by rotation of the lead screw 74. An eccentric sleeve 76 internally threaded at one end, as indicated at 78 in FIGURE 3, engages the threads of lead screw 74. The eccentric sleeve 76 is clamped to carriage 72 and moves therewith, and is provided with a bore 84 which closely engages the apex of threads of lead screw 74 so that the unthreaded portion of the bore of eccentric sleeve 76 will make continuous contact with the apex of the threaded lead screw to assure that the axis of ball carriage 72 will always remain parallel to lead screw 74. The bore 84 of sleeve 76 is machined to fit the outside diameter of lead screw 74 with a clearance of approximately two tenths of a thousandth of an inch.

The manner in which eccentric sleeve 76 is used in connection with the ball carriage 72 is similar in function to that illustrated and described in U.S. Patent Number, 3,004,411, issued to Willard J. Opocensky on October 17, 1961.

Rotation of lead screw 74 is introduced from an exterior source such as that shown in FIGURE 3, wherein a driving gear 86, rotated from some source such as a computer, meshes with a driven gear 88 secured to load screw 74.

At the opposite end a planetary differential 89, shown in FIGURE 4, functions with lead screw 74, and is provided with a disk 90 which is rigidly secured on screw 74 by a collar clamp 92. A pinion 94 is rotatably secured to the disk 90, and meshes with an internal gear 96 which is retained in a fixed position by a round head cap screw 98 engaged in a notch 100 in the periphery of internal gear 96 to prevent its rotation. This internal gear 96 is provided with a hub 102 which engages a countersunk bore 104 in the end wall 40. A radial bearing 106 is located in the hub 102 and provides a bearing support for one end of lead screw 74. A second internal gear 108 is freely rotatably mounted on second hub 110 of disk 90 and meshes with pinion 94.

The fixed internal gear 96 may have sixty-three teeth and freely rotating internal gear 108 may have sixty-four teeth, so that internal gear 108 will make one revolution for each 64 revolutions of lead screw 74 and disk 90.

Rotable internal gear 108 and disk 90 are provided with notches 112 and 114, respectively, and are adapted to be engaged by a roller 116, when both notches are aligned, as illustrated in FIGURES 1, 4 and 5. Notches 112 and 114 are aligned only when ball carriage 72 positions transmission balls 70 in the zero position.

Roller 116 is rotatably secured to a lever 118 which may be pivotally attached to end wall 40 at pivot 120. As shown in FIGURE 1, the opposite end of lever 118 may be provided with a projection 122 to engage the operating pin 124 of a micro-switch 126. When the aforementioned parts are in the position illustrated in FIGURE 1, and coincidentally the carriage 72 is in the zero position, as illustrated in FIGURE 6, the electrical switching circuit is broken to motor 12 by reason of the micro switch contacts being disengaged. As long as ball carriage 72 remains in this position, the switching circuit to motor 12 will remain open, the input disk will not be rotated, and no wearing will occur to transmission balls 70 or input disk 20.

The purpose of the pivotally mounted frame member 46 and the compression spring 60 is to cause the output disk 58, which is connected to the frame member 46 by radial bearings 52, to exert a force against transmission balls 70, which are in turn forced against the surface of input disk 20. This exerts the force necessary to prevent slippage and resulting error in the various elements that are friction driven.

If an integrator having a spring loaded input disk or output cylinder is to be used in equipment that is subject to extreme shock and vibration, there is a danger that the spring loaded element may impart a sharp blow to the transmission balls, thus causing a flat section on the surface of the balls or an indentation in the surface of the input disk or output cylinder. The invention disclosed herein contemplates such a condition and provides a means of eliminating the danger of such damage by limiting the amount of deviation the spring loaded member may travel.

As shown in FIGURE 6, the output cylinder 58 is supported by radial bearings 52 to the spring loaded frame member 46. The periphery of radial bearing 52 is also permitted to partially extend into bored holes 66 in the end walls of integrator housing 28. As noted earlier, the diameter of bored holes 66 exceeds the outside diameter of radial bearings 52 by an amount which may be approximately two thousandths of an inch. This slightly oversized bore permits radial bearing 52 and output cylinder 58 to deviate only by the amount of the oversize.

The result is that output cylinder 58, being thus limited, is unable to develop sufficient energy to provide a "hammer-like" blow to transmission balls 70 that can cause damage to the various surfaces.

The integrator described and illustrated in FIGURES 1 through 6 functions in the following manner: a torque is transmitted from motor 12 through gears 16 into input shaft 18 and input disk 20. The torque is transmitted through the balls 70, as long as they remain on either side of the zero position, to output cylinder 58 and output shaft 56. Concurrently, either or both of notches 112 and 114 will be out of alignment with roller 116 on lever 118, causing the roller to ride on the periphery of disk 90 and gear 108. In this position the projection 122 on lever 118 will be depressing the operating pin 124 of micro switch 126, causing the contracts of micro switch 126 to remain closed, thus energizing the electrical circuit to motor 12 which will continue to drive disk 20.

At any time transmission balls 70, retained in ball carriage 72, reach the zero position on disk 20, the notches 112 and 114 will be aligned with the roller 116. When roller 116 drops into the notches 112 and 114, it will allow the lever 118 to rotate about its pivot 120 to open the micro switch operating pin 124. As previously described, this will open the electrical switching circuit to stop motor 12.

FIGURE 7 illustrates another modification in which the integrator is coupled through an electrically operated clutch to a driving means.

The integrator, indicated generally as 130, is connected electrically by a system of wiring 132 to an electrically operated clutch 134. A driving means, generally illustrated by gears 146, provides a continuous drive into the clutch 134. The output drive of clutch 134 may be coupled directly to input shaft of integrator 130. When the ball carriage is in the zero position and the electrical switching mechanism is in the position as illustrated in FIGURE 7, the electrical circuit to the clutch 134 will be open causing the torque drive to the integrator to be disengaged by the clutch 134.

At any time that the ball carriage is moved out of the zero position, the electrical switch will be activated to energize the electrical circuit and the clutch 134. When clutch 134 is engaged, torque is transmitted to the integrator 130.

Although preferred embodiments of this invention are described in the foregoing description and illustrated in the accompanying drawings, it will be understood that it

What is claimed is:
1. A computing integrator comprising:
   (A) a housing,
   (B) a first rotatable input shaft mounted in said housing,
   (C) driving means coupled to said first rotatable input shaft,
   (D) a rotatable disk mounted on said first input shaft,
   (E) a frame member pivotally mounted to said housing,
   (F) a rotatable output cylinder mounted in said frame member said cylinder being in spaced relation to the surface of said rotatable disk and having its axis of rotation parallel to the surface of said rotatable disk,
   (G) a plurality of transmission balls mounted between the surface of said rotatable disk and the surface of said rotatable output cylinder, said balls adapted to rotate said cylinder at a speed proportional to the speed of rotation of said disk and the distance of said balls from the center of said disk,
   (H) a ball carriage suspended between said output cylinder and said rotatable disk for retaining said plurality of transmission balls, said carriage adapted for linear movement parallel to the axis of said rotatable output cylinder and having an internally threaded bore parallel to the direction of movement of said carriage,
   (I) spring means associated with said frame member for exerting a force by said output cylinder against said transmission balls and against said rotatable disk to prevent said balls from slipping on the surfaces of said disk and said cylinder,
   (J) a rotatable output shaft coupled to said output cylinder and extending through a hole in said frame member and a larger hole in said housing,
   (K) a radial bearing mounted in the hole in said frame member and loosely mounted in the hole in said housing, said bearing adapted to receive said rotatable output shaft and adapted to restrict the movement of said housing whereby the motion of said frame member and said output cylinder are limited,
   (L) a second rotatable input shaft mounted in said housing said second shaft being threaded to engage said internally threaded bore in said ball carriage, whereby rotation of said second input shaft will move said ball carriage and said transmission balls across the surface of said rotatable disk,
   (M) planetary gearing coupled to said housing and to said second input shaft, said gearing adapted to provide an index when said transmission balls are positioned in the center of said rotatable disk,
   (N) an electric switch operable by the index provided by said planetary gearing, said switch being electrically coupled to said driving means to halt the operation of said driving means when said transmission balls are in position in the center of said rotatable disk.
2. A computing integrator comprising:
   (A) a rotatable input disk and an output member,
   (B) driving means coupled to said input disk,
   (C) a ball carriage disposed between said disk and said output member and radially adjustable of said disk, said carriage having an internally threaded bore parallel to the direction of radial adjustment of said carriage,
   (D) a pair of balls within said carriage respectively in driving engagement with said disk, said output member and each other,
   (E) a rotatable threaded lead screw coupled to said internally threaded bore in said ball carriage and adapted to adjust said ball carriage across the surface of said disk upon rotation of said lead screw,
   (F) planetary gearing means coupled to said rotatable threaded lead screw for providing an index when said ball carriage and said balls are positioned at the center of said disk,
   (G) electrical switching means coupled to said driving means and responsive to said index to halt the operation of said driving means, whereby said disk becomes stationary when said balls are positioned in the center of said disk.
3. A computing integrator comprising:
   (A) a rotatable input disk and an output member,
   (B) driving means coupled to said input disk,
   (C) a ball carriage disposed between said disk and said output member and radially adjustable of said disk,
   (D) a pair of balls within said carriage respectively in driving engagement with said disk, said output member and each other,
   (E) a rotatable shaft coupled to said ball carriage for adjusting said carriage and said balls to a desired position on the diameter of said rotatable input disk,
   (F) index means associated with said rotatable shaft to provide an index when said balls are positioned in the center of said rotatable input disk,
   (G) switching means coupled between said index means and said driving means, said switching means being responsive to said index means to halt said driving means, whereby said rotatable input disk is halted when said balls are positioned in the center of said disk.
4. A computing integrator comprising:
   (A) a rotatably mounted input disk,
   (B) a drive mechanism coupled to said disk for rotating said disk,
   (C) a cylinder rotatably mounted on an axis parallel to the face of said disk,
   (D) a pair of torque transmitting balls positioned in driving engagement between said disk and said cylinder,
   (E) a ball carriage for retaining said balls,
   (F) adjusting means coupled to said ball carriage for adjusting said ball carriage over the diameter of said disk, and
   (G) switching means coupled between said adjusting means and said drive mechanism for interrupting the operation of said drive mechanism at a predetermined position of said carriage.
5. A computing integrator comprising:
   (A) a housing,
   (B) a rotatable input disk within said housing,
   (C) a frame member pivotally mounted to said housing,
   (D) a rotatable output cylinder within said housing said cylinder being in spaced relation to the surface of said disk and having its axis of rotation parallel to the surface of said disk,
   (E) a pair of balls mounted in an adjustable carriage between said disk and said cylinder, said balls being in driving engagement with said cylinder, said disk, and each other,
   (F) spring means coupled between said frame member and said housing for exerting a force to maintain driving engagement between said cylinder, said disk, and said balls,
   (G) a bearing coupled to said rotatable output cylinder and adapted to be mounted in a hole in said frame member and partially in a larger hole in said housing, whereby the movement of said bearing in said larger hole will restrict the movement of said output cylinder.
6. A computing integrator comprising:
   (A) a rotatably mounted disk,

(B) a cylinder rotatably mounted in spaced relation to said disk on an axis parallel to the face of said disk, said cylinder being movable in its spaced relation to said disk,
(C) a pair of balls positioned in driving engagement between said disk and said cylinder,
(D) a movable carriage for retaining said balls,
(E) spring means for urging said cylinder in pressure engagement with said balls, and
(F) limiting means for restricting the movement of said cylinder away from said balls.

References Cited in the file of this patent

UNITED STATES PATENTS

| | | |
|---|---|---|
| 2,687,043 | Umsted | Aug. 24, 1954 |
| 2,985,026 | Rappaport et al. | May 23, 1961 |
| 3,051,009 | Mernyk | Aug. 28, 1962 |